No. 850,538. PATENTED APR. 16, 1907.
C. O. NEWMAN.
GLASS ORNAMENTATION FOR PANELS, FLOORS, &c.
APPLICATION FILED DEC. 19, 1905.
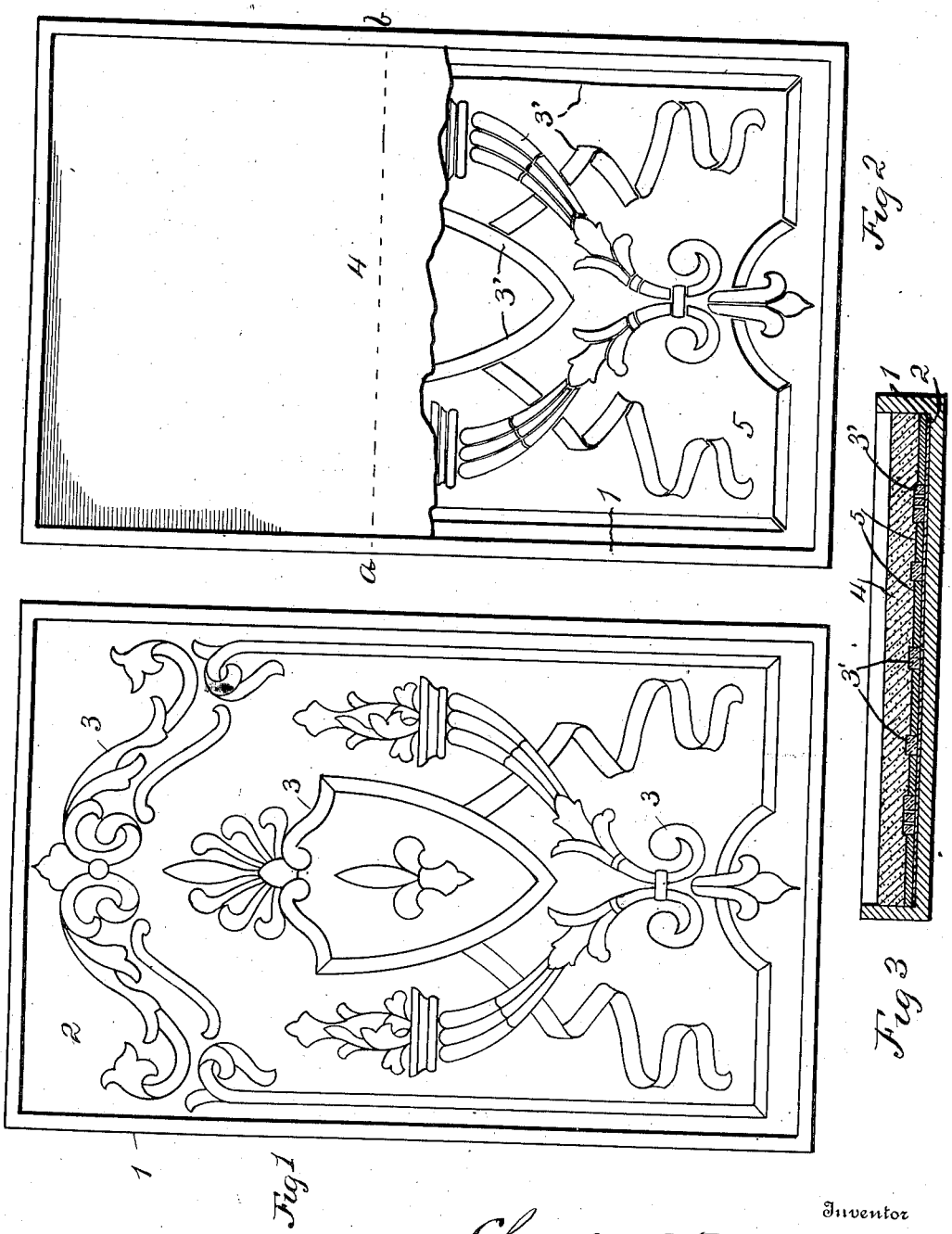

UNITED STATES PATENT OFFICE.

CHARLES O. NEWMAN, OF JACKSON COUNTY, MISSOURI.

GLASS ORNAMENTATION FOR PANELS, FLOORS, &c.

No. 850,538.  Specification of Letters Patent.  Patented April 16, 1907.

Application filed December 19, 1905. Serial No. 292,466.

*To all whom it may concern:*

Be it known that I, CHARLES O. NEWMAN, a citizen of the United States, residing in the county of Jackson and State of Missouri, have invented new and useful Improvements in Glass Ornamentation for Panels, Floors, &c., of which the following is a specification.

My invention relates to improvements in glass ornamentation for panels, floors, and similar purposes.

The object of my invention is to provide a novel process, hereinafter fully described and claimed, for making molded plates for flooring, borders, panels, wainscoting, and similar purposes, these plates being sanitary, durable, and highly artistic in effect.

The plates produced by my process are much cheaper to manufacture and are more artistic than glass mosaic, for which they may be substituted. The plates made by my process comprise each a molded body consisting of pieces of colored glass corresponding in shape to the elements forming the foreground of any desired design and embedded with their faces exposed in positions corresponding to the design in a hardening plastic material corresponding to the background of the design.

My invention provides, further, the embedding of the glass pieces with their faces exposed in relief in the hardening plastic material, thus bringing out more prominently the foreground of the design and presenting an extremely hard and durable surface for receiving wear.

My invention provides, further, the tinting with mineral paint the faces of the glass pieces and material forming the background in colors corresponding to the colors in the design, the painted substances having their faces covered with transparent enamel to protect the paint.

Other novel features of my invention are hereinafter fully described and claimed.

In the accompanying drawings, which illustrate a means for carrying my process into effect, Figure 1 is a plan view of the mold having placed therein the original design-sheet. Fig. 2 is a plan view of the mold having placed therein the glass pieces forming the foreground, a portion of the mold containing the plastic hardening material forming the background. Fig. 3 is a cross-section taken on the dotted line *a b* of Fig. 2.

Similar characters of reference denote similar parts.

1 denotes a mold of any desired shape and represented as rectangular in the drawings.

2 denotes the original design-sheet, the elements representing the foreground of the design being represented by 3.

3' denote the colored glass pieces corresponding in shape and position to the elements 3 of the design and embedded with their faces exposed, preferably in relief, in a hardening plastic material, denoted by 4, and composed, preferably, of a mixture of calcined magnesia and a solution of chlorid of magnesia.

5 denotes a filler thinner than the glass pieces 3' and placed within the mold between the glass pieces, as hereinafter described, and for the purpose of having said glass pieces stand in relief upon the face of the molded body or plate.

In carrying out my process the design-sheet 2 is placed face up in the mold 1, a reproduction of the elements 3 on the said sheet having been previously made upon a sheet 5, (shown in Fig. 3 in exaggerated thickness,) and which I call the "filler" or "pattern-sheet." The filler or pattern-sheet is preferably made of paper. With a pair of three-bladed shears each element 3 on the pattern-sheet is cut from the sheet. The cut-out portions of the pattern-sheet are then used as patterns in cutting from colored sheet-glass, the pieces 3' representing the foreground of the design. By employing the three-bladed shears for cutting out the different pieces of the pattern-sheet a narrow strip is cut along every line of the design on the pattern-sheet. Thus each element or piece 3 cut out of the pattern-sheet is smaller than the corresponding element 3 on the design-sheet 2. The glass pieces 3' are cut the same size as the cut-out portions of the pattern-sheet, so that when the glass pieces are placed face down in the mold in their proper positions upon the design-sheet 2 a narrow space will be left between adjacent pieces of glass 3', as shown in Fig. 2. The glass pieces 3' having been placed and preferably glued in their proper positions upon the design-sheet and within the mold 1, the pattern-sheet 5 is then placed within the mold and embracing the glass pieces 3', as shown in Figs. 2 and 3. The mold 1 is then filled to the depth required with a plastic mixture composed of calcined magnesia and a sufficient quantity of a solution of chlorid of magnesia to render the mixture plastic. The mold is then permitted to stand until the plastic mixture becomes hardened or set, after which the hardened mixture with the glass pieces 3' embedded therein are removed from the mold. The pattern-sheet 5 is then stripped from the molded plate or body, thus leaving the glass pieces 3' standing in relief on the face side of the molded body.

It will of course be understood that the pieces of glass 3' employed shall correspond, respectively, in color as nearly as possible to the colors represented by the corresponding elements 3 of the design; but it will be evident that it would be impracticable, if not impossible, to obtain in the glass pieces exact reproductions of the various tints—as, for instance, the different tints on the petal of a flower. Where one element of the design embodies different tints, I obtain the same effect in the finished product by coating the face of the glass piece representing the element with mineral paint having the tints corresponding to those desired. When it is desired to have the background represented by the plastic material 4 tinted to correspond to certain colors represented on the original design-sheet 2, the background may be coated with mineral paints of the proper colors, after which a coating of transparent enamel is given to the face of the molded body or plate. If desired, the enameled plate may then be baked in the ordinary manner employed in baking enameled painted pottery.

When it is desired to have the faces of the glass pieces 3' and the material 4 forming the background flush with each other, the filler-sheet 5 is not placed in the mold, the plastic material 4 being placed directly in the mold upon the design-sheet 2.

In the plate formed by my improved process it is necessary to cut from glass only that portion representing the foreground of the design, while in glass mosaic the background, as well as the foreground, is made from glass pieces, the cutting of which additional glass pieces makes the glass-mosaic work much more expensive than by reproducing a similar design by my process. A more artistic representation is obtained by the use of my process owing to the lack of the numerous lines unavoidably present in the background, of glass mosaic, which lines result from the employment of so many pieces of glass used to form the background of the glass mosaic.

Panels, floors, wainscoting, &c., covered with plates made by my improved process may be made artistic, comparatively inexpensive, fireproof, sanitary and durable, and may be washed without injury.

Having thus described my invention, what I claim, and desire to secure by Letters Patent, is—

1. The process of making decorative work for panels, floors and similar purposes, consisting in cutting from sheet-glass pieces corresponding in shape to the elements respectively forming the foreground of a design, then placing the glass pieces face down in a mold in separated positions corresponding to the design, then inserting in the mold between the glass pieces and in the places forming the background a filler of less thickness than the glass pieces, then placing in the mold upon the filler and the glass pieces a plastic hardening material, then permitting the plastic material to set and finally removing the molded body from the mold and filler.

2. The process of making decorative work for panels, floors and similar purposes, consisting in cutting from sheet-glass pieces corresponding in shape to the elements respectively forming the foreground of a design, then placing the glass pieces face down in a mold in separated positions corresponding to the design, then inserting in the mold between the glass pieces and in the places forming the background, a filler of less thickness than the glass pieces, then placing in the mold upon the filler and the glass pieces a plastic hardening material, then permitting the plastic material to set, then removing the molded body from the mold and filler, and finally coating the face of the body so molded with enamel.

3. The process of making decorative work for panels, floors and similar purposes, consisting in placing face down in a mold, glass pieces corresponding in shape respectively to the elements forming the foreground of a design and in separated positions corresponding to the design, then inserting in the mold in the places forming the background a filler of less thickness than the glass pieces, then placing in the mold upon the filler and the glass pieces a plastic mixture of calcined magnesia, mixed with a solution of chlorid of magnesia, then permitting the plastic mixture to set and removing the molded body from the mold and filler.

4. The process of making decorative work for panels, floors and similar purposes, consisting in placing face down in a mold in separated positions, glass pieces corresponding in shape to the elements respectively forming the foreground of a design and in positions corresponding to the design, then inserting in the mold in the places forming the background between and around the glass pieces, a filler of less thickness than the glass pieces, then placing in the mold upon the filler and the glass pieces, a plastic mixture of calcined magnesia mixed with a solution of chlorid of magnesia, then permitting the plastic mixture to set, then removing the molded body from the mold and filler, and finally covering the face of the molded body with enamel.

In testimony whereof I affix my signature in presence of two subscribing witnesses.

CHARLES O. NEWMAN.

Witnesses:
 WARREN D. HOUSE,
 HENRY F. ROSE.